United States Patent
McCombs et al.

(10) Patent No.: US 6,959,728 B2
(45) Date of Patent: Nov. 1, 2005

(54) ROTARY CAM VALVE

(75) Inventors: Norman R. McCombs, Tonawanda, NY (US); Robert Casey, Buffalo, NY (US); Robert Bosinski, West Seneca, NY (US)

(73) Assignee: AirSep Corporation, Buffalo, NY (US)

( * ) Notice: Subject to any disclaimer, the term of this patent is extended or adjusted under 35 U.S.C. 154(b) by 0 days.

(21) Appl. No.: 10/932,191

(22) Filed: Sep. 1, 2004

(65) Prior Publication Data

US 2005/0045236 A1    Mar. 3, 2005

Related U.S. Application Data

(60) Provisional application No. 60/499,542, filed on Sep. 2, 2003.

(51) Int. Cl.[7] ................................. F17D 3/00
(52) U.S. Cl. ...................... 137/624.18; 137/596.1; 137/596.17
(58) Field of Search ................. 137/624.18, 624.2, 137/596.17, 596.1

(56) References Cited

U.S. PATENT DOCUMENTS

| | | | |
|---|---|---|---|
| 4,285,268 A | * | 8/1981 | Deckler ........................ 91/517 |
| 4,744,285 A | * | 5/1988 | Presley .................. 137/624.18 |
| 5,117,870 A | * | 6/1992 | Goodale et al. ......... 137/636.1 |
| 6,558,451 B2 | * | 5/2003 | McCombs et al. ............. 95/98 |

* cited by examiner

Primary Examiner—Kevin Lee
(74) Attorney, Agent, or Firm—Hiscock & Barclay, LLP

(57) ABSTRACT

A multiple fluid flow controller valve device having radially disposed a number of valves and a central rotary shaft with cam surfaces functioning as the valve controller to open and close the valves in the desired sequence.

8 Claims, 15 Drawing Sheets

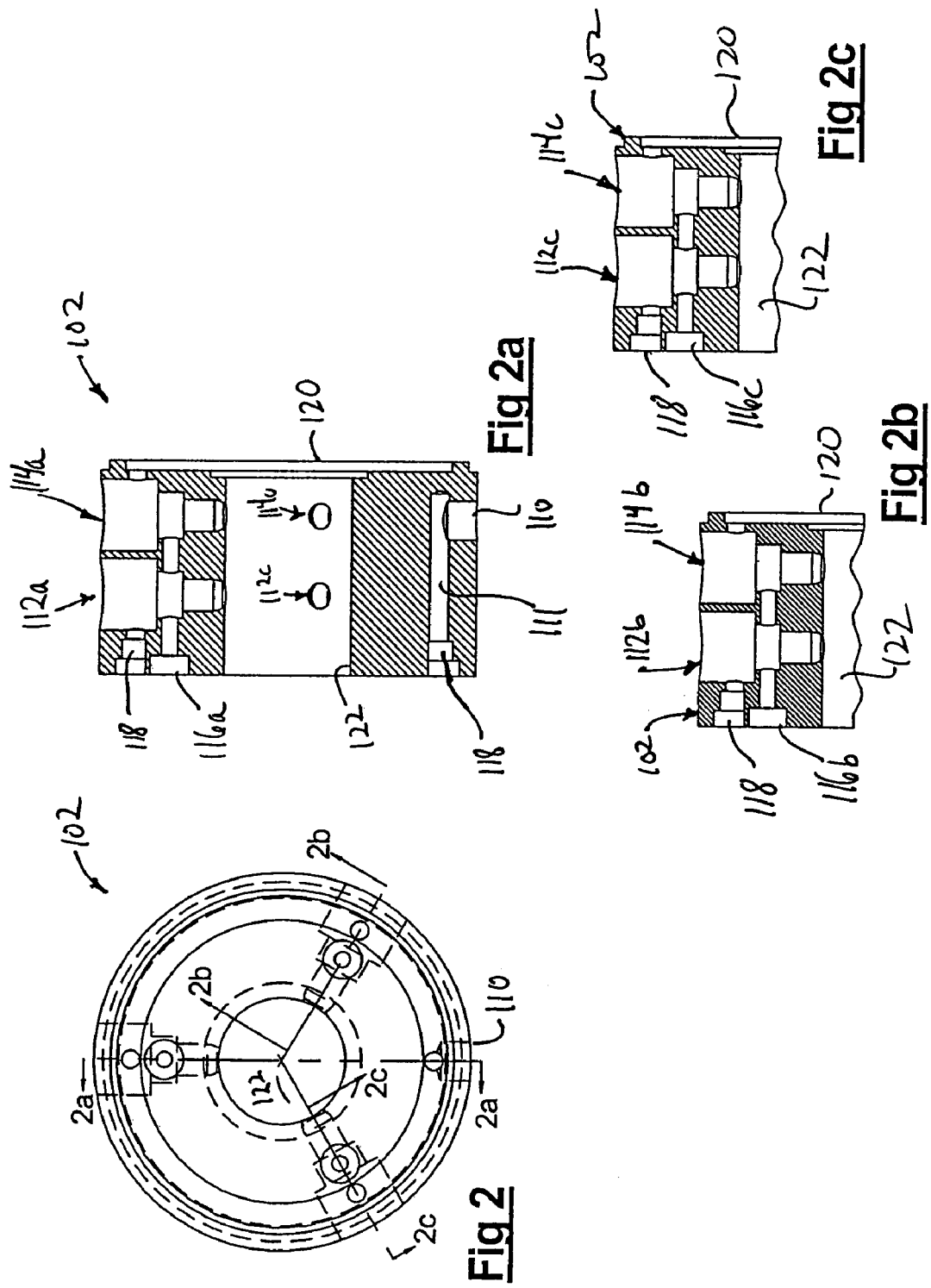

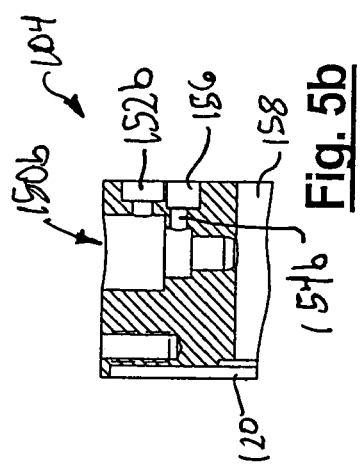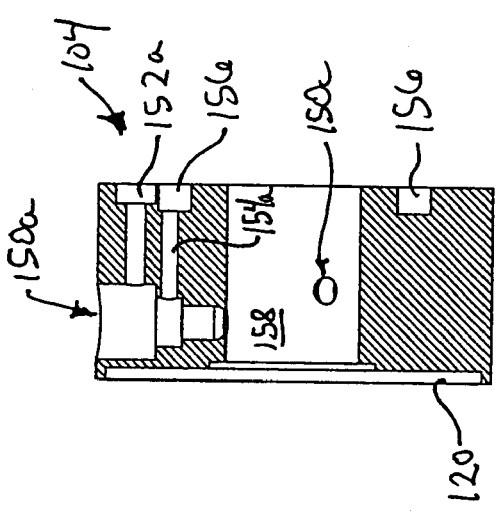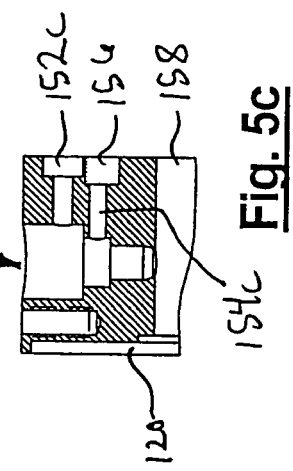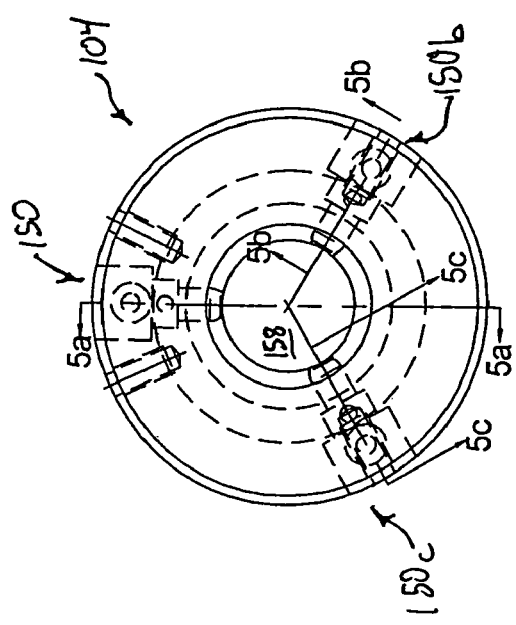

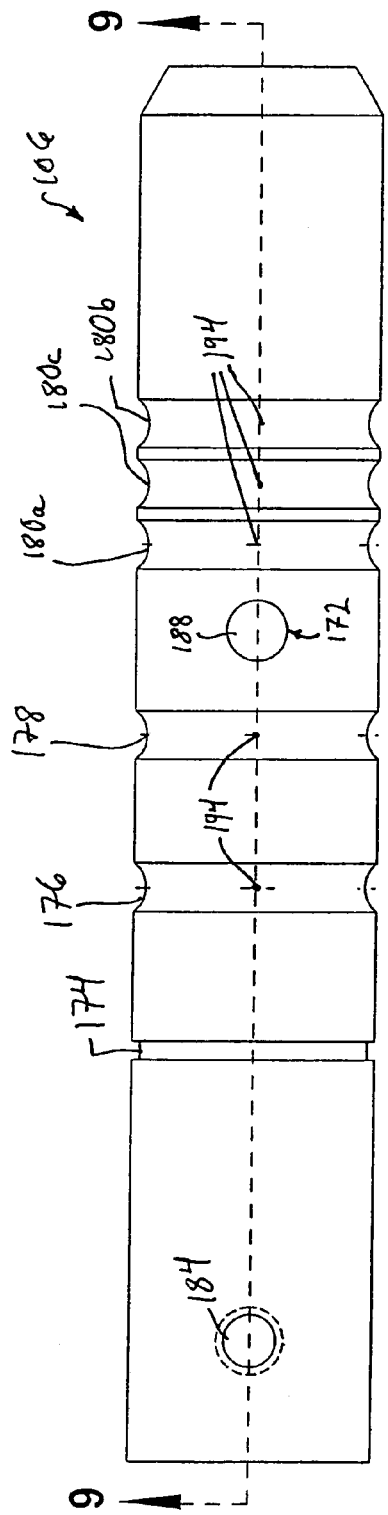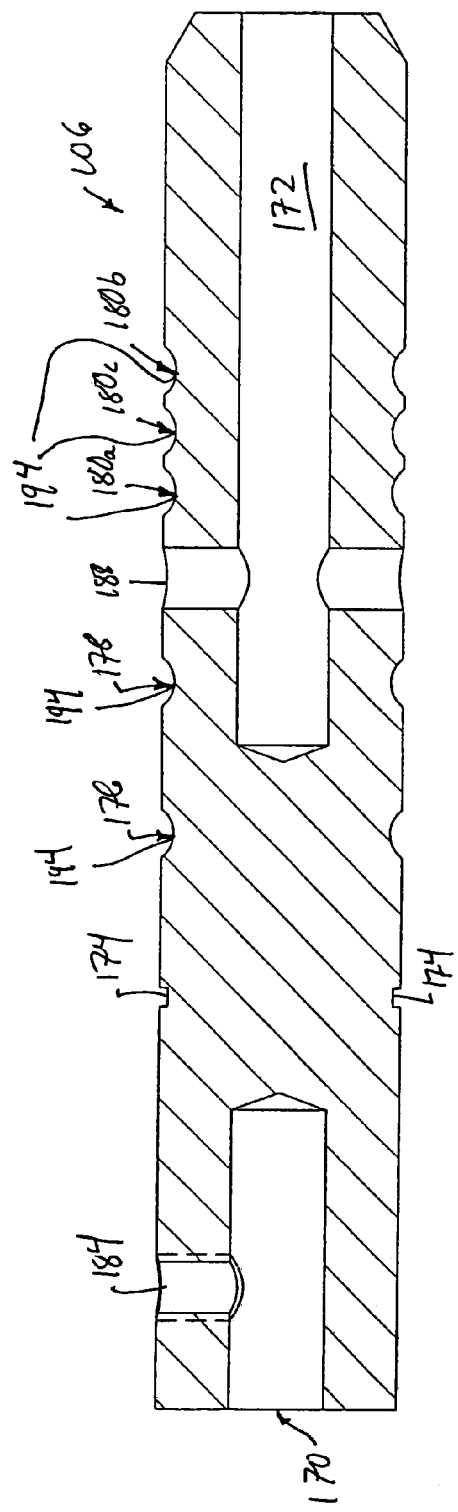
Fig 8
Fig 9

ROTARY CAM VALVE

CROSS-REFERENCE TO RELATED APPLICATIONS

This application claims priority from Provisional Patent Application Ser. No. 60/499,542, filed Sep. 2, 2003.

FIELD OF THE INVENTION

This invention relates to valves used in multiples to control fluid flow.

BACKGROUND OF THE INVENTION

It is often desirable to reduce the size and weight of a fluid handling apparatus, such as an oxygen concentrator used for medical purposes, to increase its portability and ease of use. The inputs and outputs of the components in such an apparatus are generally controlled by solenoid valves in conjunction with a computer that actuates the valves in the appropriate sequence. The control of a number of input/output pairs of fluid handling units in such an oxygen concentrator conventionally requires at least double or more of separate valves. For example, the control of 3 input/output pairs of an oxygen concentrator conventionally requires at least 9 separate valves. This bank of valves is generally bulky and includes complicated input and output passageways. The input and output passageways generally consist of plastic tubes that have a limit on how much they may bend and thus these passageways tend to waste space around the bank of valves.

Therefore, a compact and reliable multiple valve device to perform the valve functions for the input/output pairs of a fluid handling device is desired in the art.

SUMMARY OF THE INVENTION

The invention comprises, in one form thereof, a multiple fluid flow controller valve device having radially disposed a number of valves and a central rotary shaft with cam surfaces functioning as the valve controller to open and close the valves in the desired sequence. More particularly, the rotary cam valve includes a plurality of radially disposed intake valves, and a plurality of radially disposed output valves actuated by an electric stepper motor or a pneumatic actuator. A manifold core includes a plurality of cams, and each of the cams engages at least one intake valve or at least one output valve to actuate the valve. An actuator rotates the manifold core in predetermined amounts and times in step fashion. The actuator has a predetermined schedule for time between rotations. The timing schedule of the actuator and the configuration of the plurality of cams are selected to control said fluid flows according to requirements of the system.

BRIEF DESCRIPTION OF THE DRAWINGS

The above-mentioned and other features and advantages of this invention, and the manner of attaining them, will become apparent and be better understood by reference to the following description of an embodiment of the invention in conjunction with the accompanying drawings, wherein:

FIGS. 2, 2a–2d, 3, and 4 are various views of the feed/waste manifold of FIG. 1a;

FIGS. 5, 5a–5d, 6, and 7 are various views of the equalization manifold of FIG. 1a;

FIGS. 8 and 9 are views of the manifold core of FIG. 1a;

Corresponding reference characters indicate corresponding parts throughout the several views. The examples set out herein illustrate one embodiment of the invention but should not be construed as limiting the scope of the invention in any manner.

DETAILED DESCRIPTION

One of many uses of a multiple valve according to the invention is a pressure swing adsorption apparatus such as a multiple bed oxygen concentrator. Such an apparatus as will be described will include feed and waste valves for each adsorption bed as well as equalization valves connecting pairs of beds. The illustrated embodiment includes three beds requiring at least nine valves.

Figure 1B:
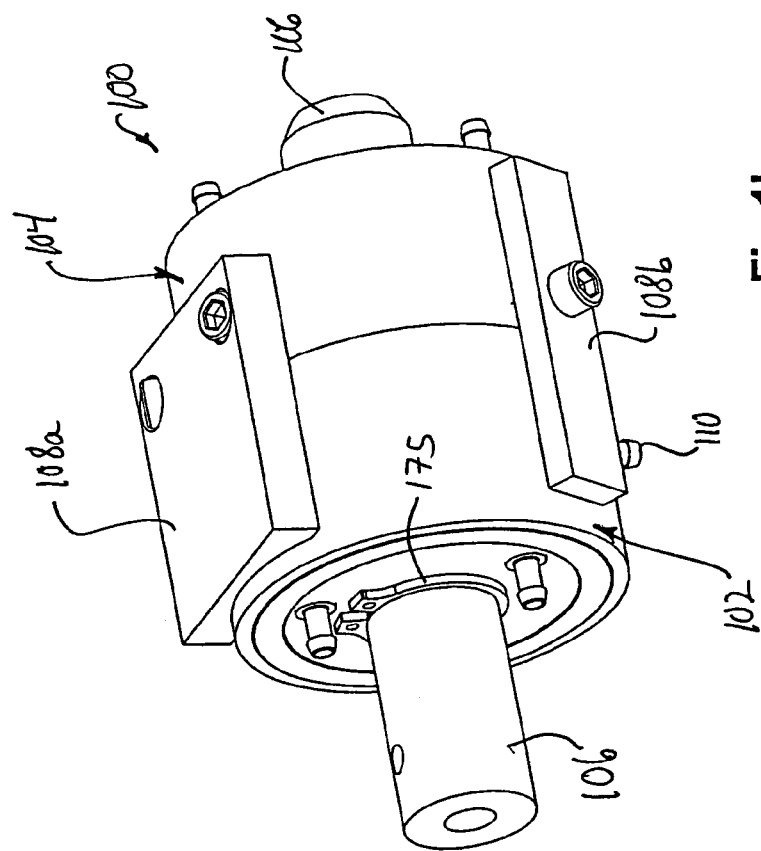
FIGS. 1a and 1b are isometric views of the rotary cam valve of the present invention.
Figure 1A:
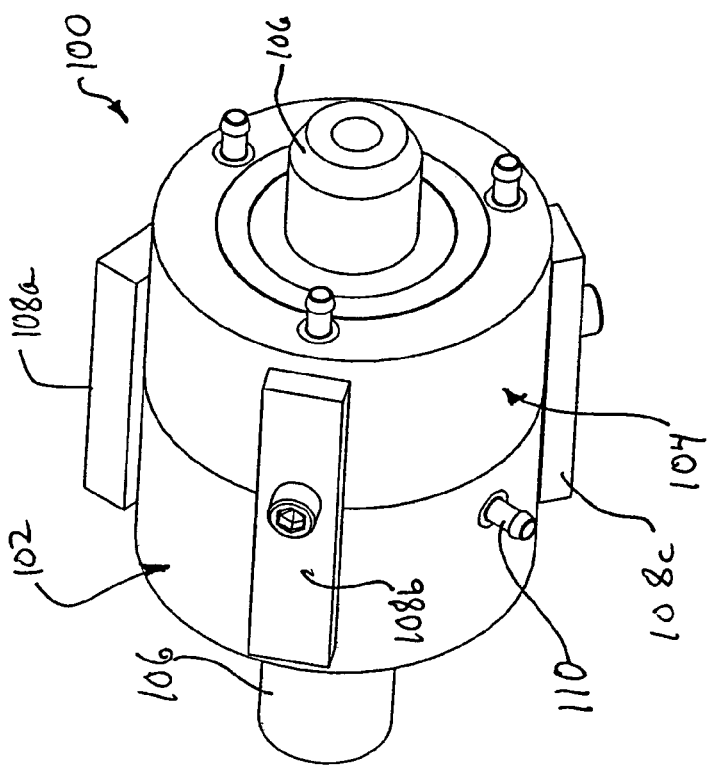

Referring to FIGS. 1a and 1b, there is shown the rotary cam valve of the present invention. The rotary cam valve 100 includes a feed/waste manifold 102, an equalization manifold 104, a manifold core 106, and valve caps 108a, 108b, and 108c.

Referring to FIGS. 2, 2a–2d, 3, and 4, feed/waste manifold 102 includes an air inlet 110, air inlet passage 111, feed poppet valve assemblies 112a, 112b, and 112c, waste poppet valve assemblies 114a, 114b, and 114c, target feed/waste passageways 116a, 116b, and 116c, a feed plenum 118, a first portion of an exhaust plenum 120, and a central bore 122. The feed plenum 118 is substantially concentric with the central bore 122 and includes a plug 119 (shown in FIG. 2d) that is press fit into the feed plenum 118 to thereby seal the feed plenum 118 from the ambient air.

Figure 2D:
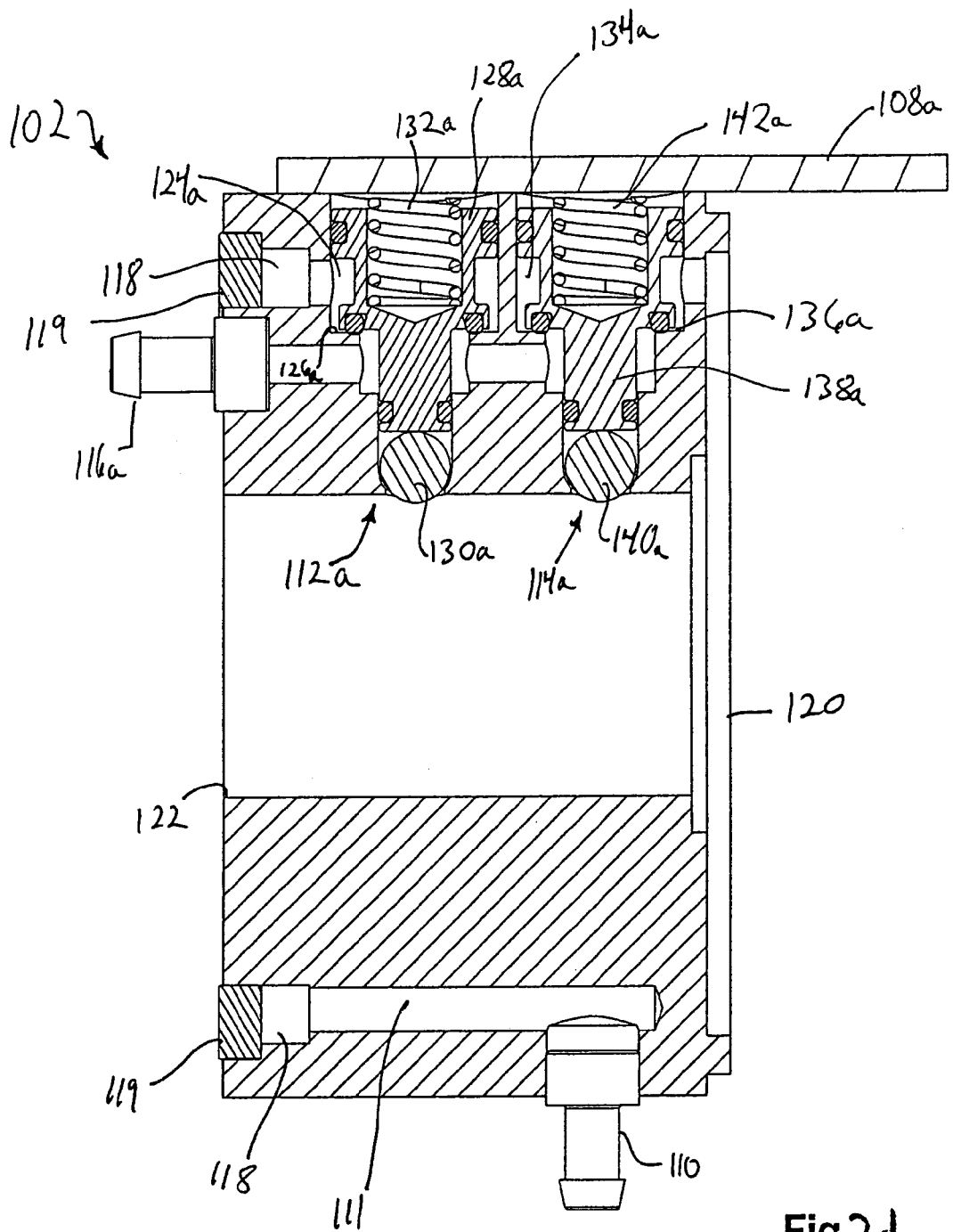
Figure 4:
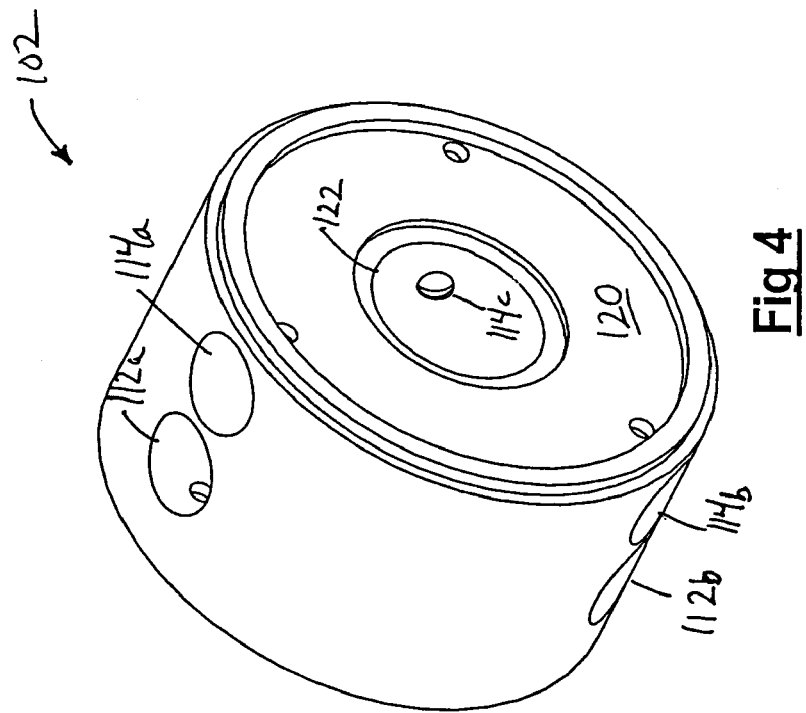
Figure 3:
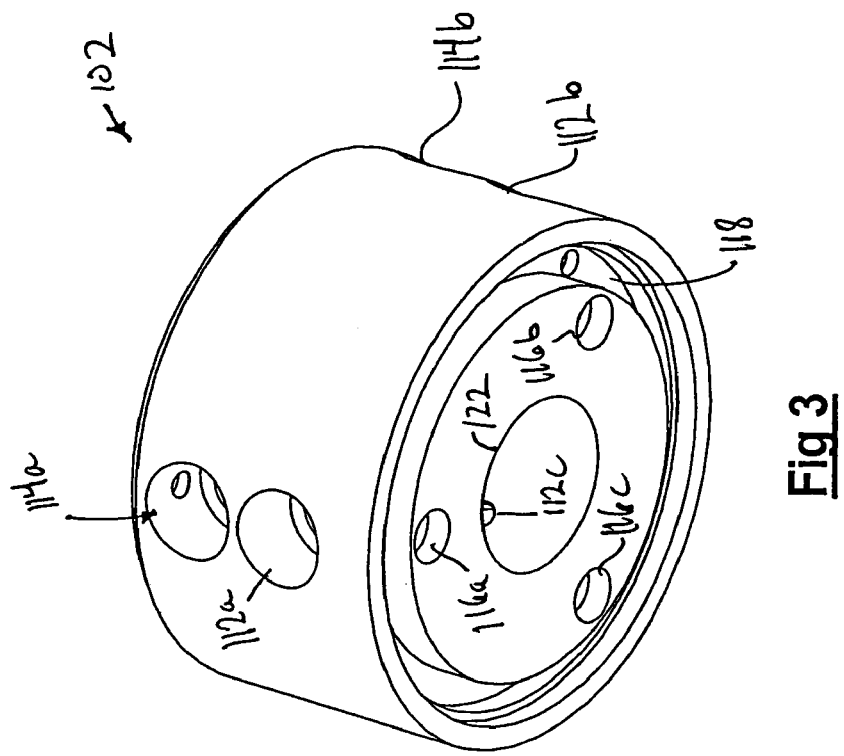

The feed poppet valve assemblies 112a, 112b, and 112c, are substantially identical, thus only one feed poppet valve assembly 112a will be described in detail. Similarly, waste poppet valve assemblies 114a, 114b, and 114c are substantially identical, thus only one waste poppet valve assembly 114a will be described in detail. Referring to FIG. 2d, the feed poppet valve assembly 112a includes a feed chamber 124a in fluid communication with the feed plenum 118, a feed valve seat 126a, a feed poppet 128a, a feed ball bearing 130a, and a feed spring 132a. The feed poppet 128a includes an o-ring preventing fluid communication between the feed chamber 124a and the ambient air. The feed poppet 128a includes a second o-ring preventing fluid communication between the target feed passageway 116a and the central bore 122. The feed poppet 128a includes a third o-ring for engaging the feed valve seat 126a when the feed poppet valve assembly 112a is closed, thereby preventing fluid communication between the feed chamber 124a and the target feed/waste passageway 116a. The feed spring 132a biases the feed poppet 128a to the closed position. The feed ball bearing 130a engages the feed poppet 128a and the manifold core 106.

Similarly, waste poppet valve assembly 114a includes a waste chamber 134a in fluid communication with the exhaust plenum 120, a waste valve seat 136a, a waste poppet 138a, a waste ball bearing 140a, and a waste spring 142a. The waste poppet 138a includes an o-ring preventing fluid communication between the waste chamber 134a and the ambient air. The waste poppet 138a includes a second o-ring preventing fluid communication between the target feed/waste passageway 116a and the central bore 122. The waste poppet 138a includes a third o-ring for engaging the waste valve seat 136a when the waste poppet valve assembly 114a is closed, thereby preventing fluid communication between the waste chamber 134a and the target feed/waste passageway 116a. The waste spring 142a biases the waste poppet 138a to the closed position. The waste ball bearing 140a engages the waste poppet 138a and the manifold core 106. The valve cap 108a retains the feed poppet 128a, the feed spring 132a, the waste poppet 138a, and the waste spring 142a within the feed chamber 124a and the waste chamber 134a, respectively.

Figure 5D:
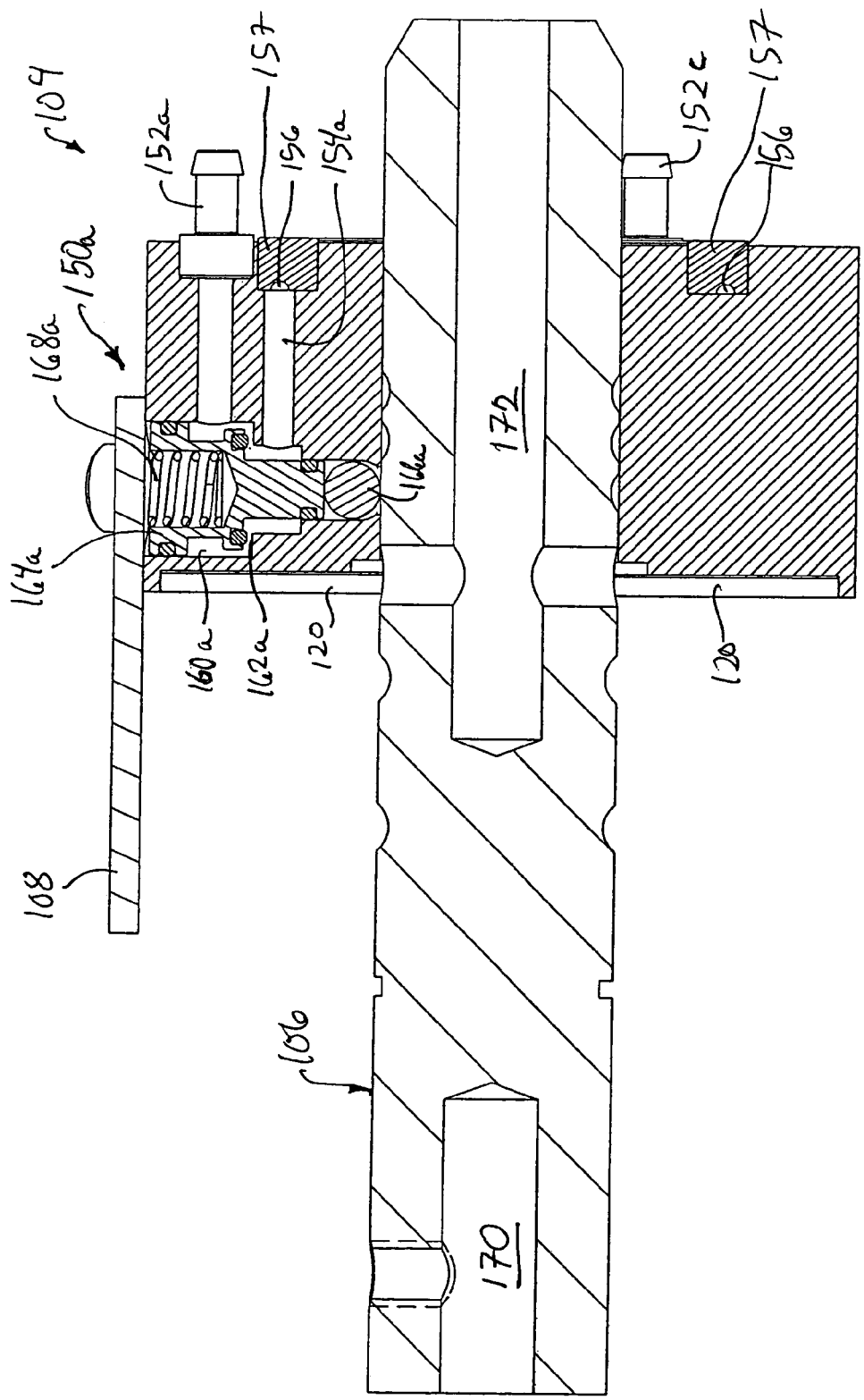
Figure 7:
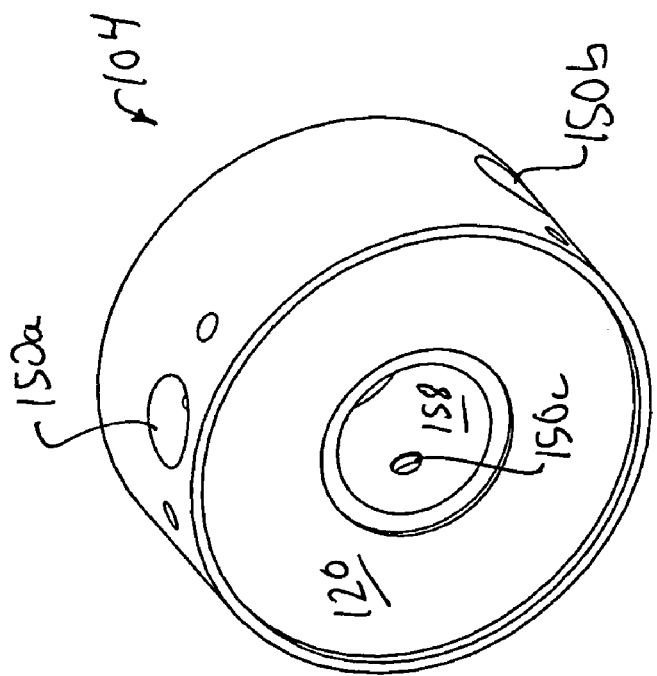
Figure 6:
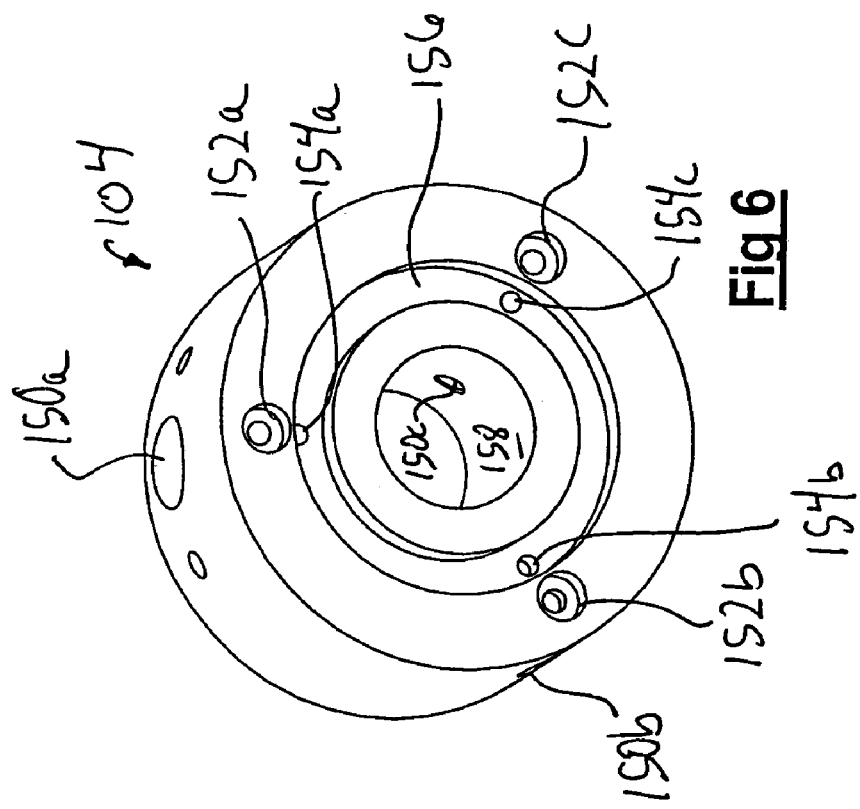

Referring to FIGS. 5, 5a–5d, 6, and 7, equalization manifold 104 includes equalization poppet valve assemblies 150a, 150b, and 150c, target equalization passageways 152a, 152b, and 152c, equalization plenum passageways 154a, 154b, 154c, an equalization plenum 156, a second portion of an exhaust plenum 120, and a central bore 158. Referring to FIGS. 5a–5c, one can see that the equalization poppet valve assemblies 150a, 150b, 150c are offset from one another and thus each occupies a unique plane transverse to the length of the substantially cylindrically shaped equalization manifold 104. The equalization poppet valve assemblies 150a, 150b, and 150c, are otherwise substantially identical, thus only one equalization poppet valve assembly 150a will be described in detail. Referring to FIG. 5d, the equalization poppet valve assembly 150a includes an equalization valve chamber 160a in fluid communication with the target equalization passageway 152a, an equalization valve seat 162a, an equalization poppet 164a, an equalization valve ball bearing 166a, and an equalization valve spring 168a. The equalization poppet 164a includes an o-ring preventing fluid communication between the equalization valve chamber 160a and the ambient air. The equalization poppet 164a includes a second o-ring preventing fluid communication between the equalization plenum passageway 154a and the central bore 158. The equalization poppet 164a includes a third o-ring for engaging the equalization valve seat 162a when the equalization poppet valve assembly 150a is closed, thereby preventing fluid communication between the equalization valve chamber 160a and the equalization plenum passageway 154a. The equalization valve spring 168a biases the equalization poppet 164a to the closed position. The equalization valve ball bearing 166a engages the equalization poppet 164a and the manifold core 106. The valve cap 108a retains the equalization poppet 164a and the equalization valve spring 168a within the equalization valve chamber 160a.

Referring to FIGS. 8 and 9 the manifold core 106 is shown. To control nine valves, the manifold core 106 includes a drive shaft receptacle 170, an exhaust passageway 172, a radial recess 174, a feed cam 176, a waste cam 178, and the equalization cams 180a, 180b, and 180c. (The lobes of the cams are not shown in FIGS. 8 and 9.) The drive shaft receptacle 170 is a blind bore that is substantially concentric with the manifold core 106 and a tapped bore 184 is provided for receiving a retaining screw for engaging a drive shaft, The exhaust passageway 172 is a blind bore and a through hole 188 is provided for putting the exhaust passageway 172 in fluid communication with the exhaust plenum 120, as best seen in FIG. 5d. The radial recess 174 receives a retaining ring 175 that is affixed to the face of the feed/waste manifold 102 as best shown in FIG. 1b.

The manifold core 106 is preferably driven by a stepped actuator such as a stepper motor or pneumatic ratcheting device. A micro-controller (not shown) controls the stepped actuator in both the angle of rotation of the manifold core 106 and the timing between rotations from step to step. For example, the micro-controller may cause the stepped actuator to rotate the manifold core 106 forty degrees, wait 0.8 second, cause another forty degree rotation, wait 2 seconds, etc.

Figure 10:
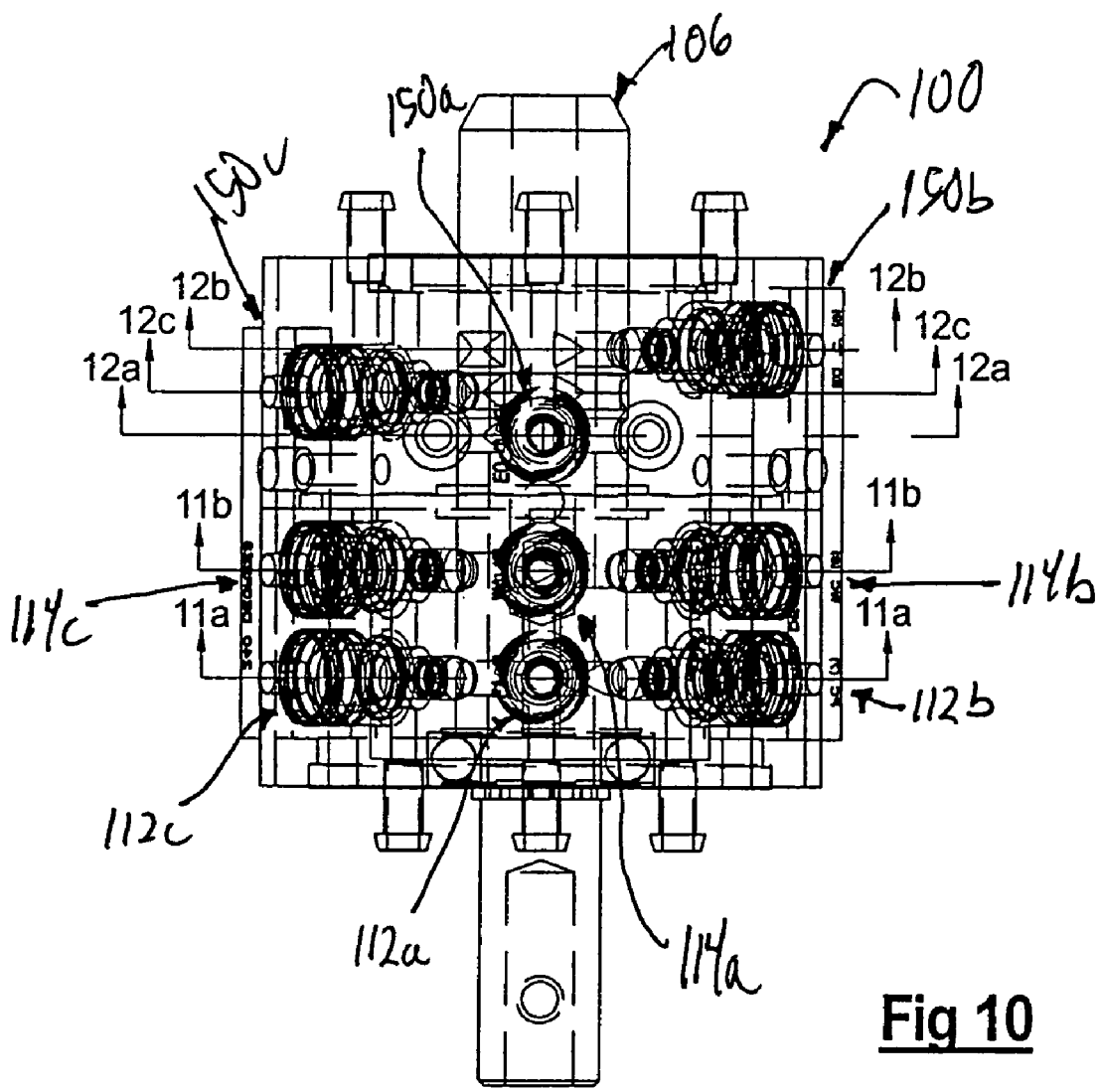
FIG. 10 is a top view of the rotary cam valve of FIG. 1a showing the location of the valves with phantom lines.
Figure 11B:
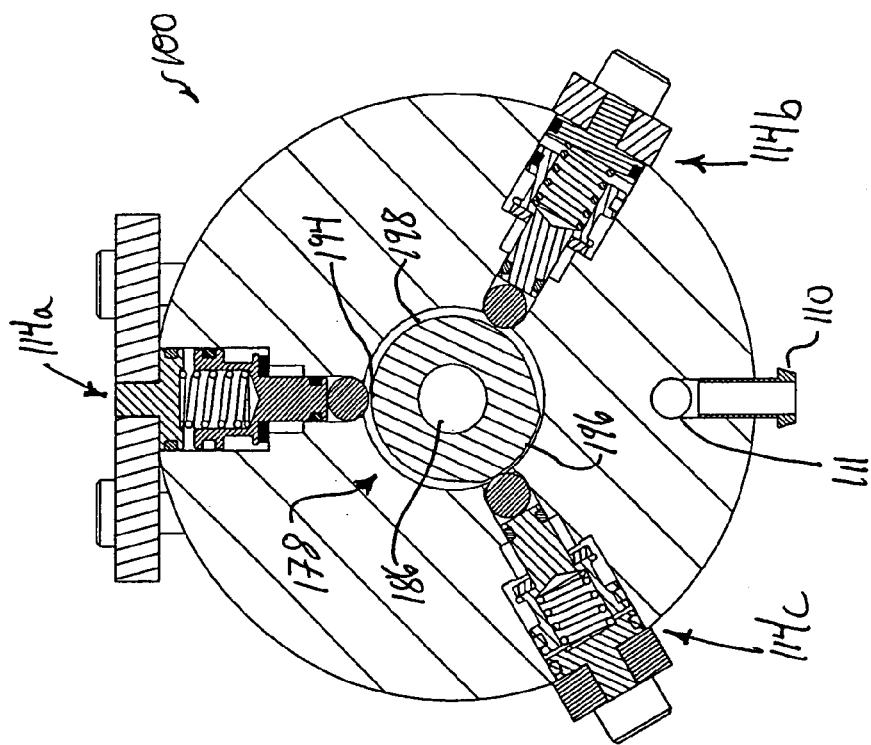
FIGS. 11a, 11b, 12a–12c are cross-sectional views of the rotary cam valve of FIG. 13 is a cross-sectional view of the assembled controller of FIG. 1.
Figure 11A:
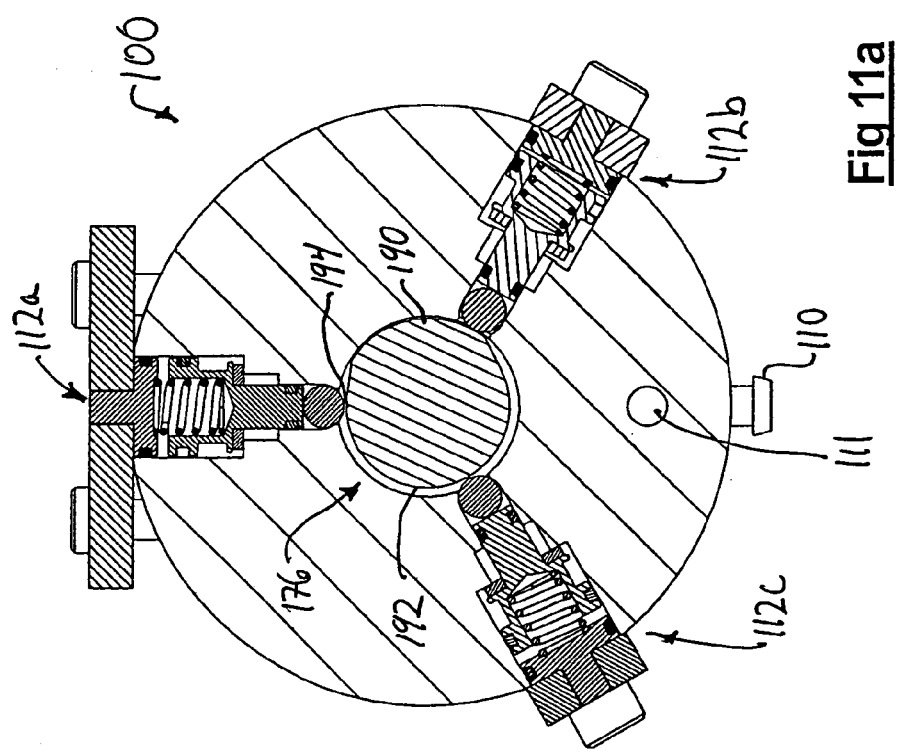
Figure 12B:
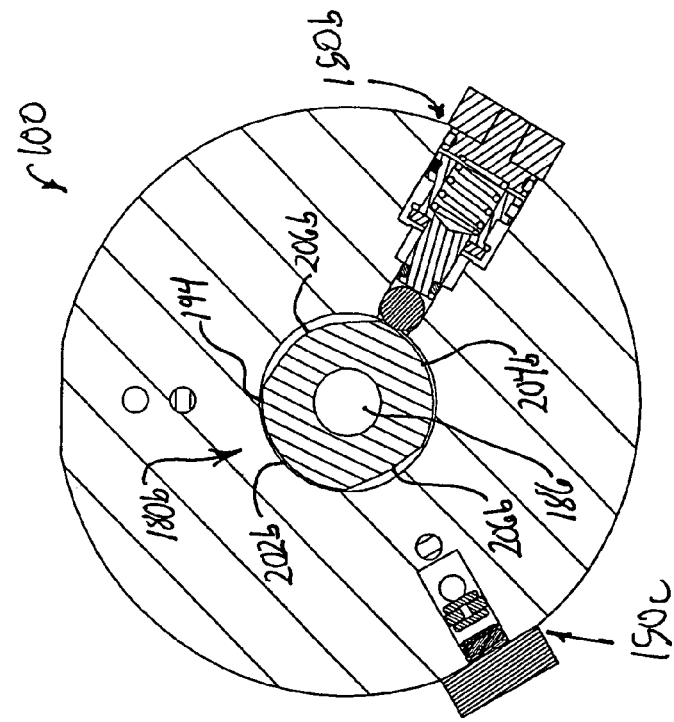
Figure 12A:
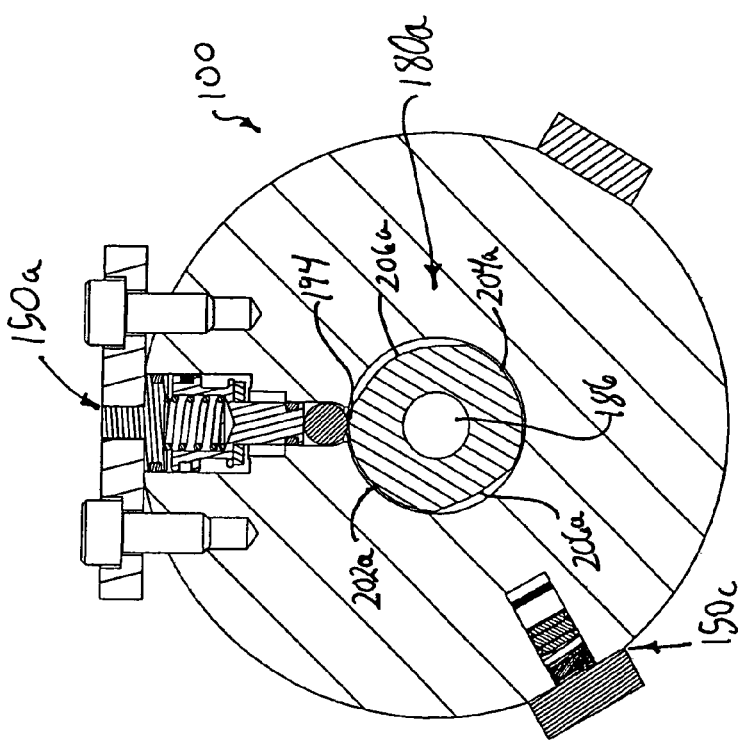
Figure 12C:
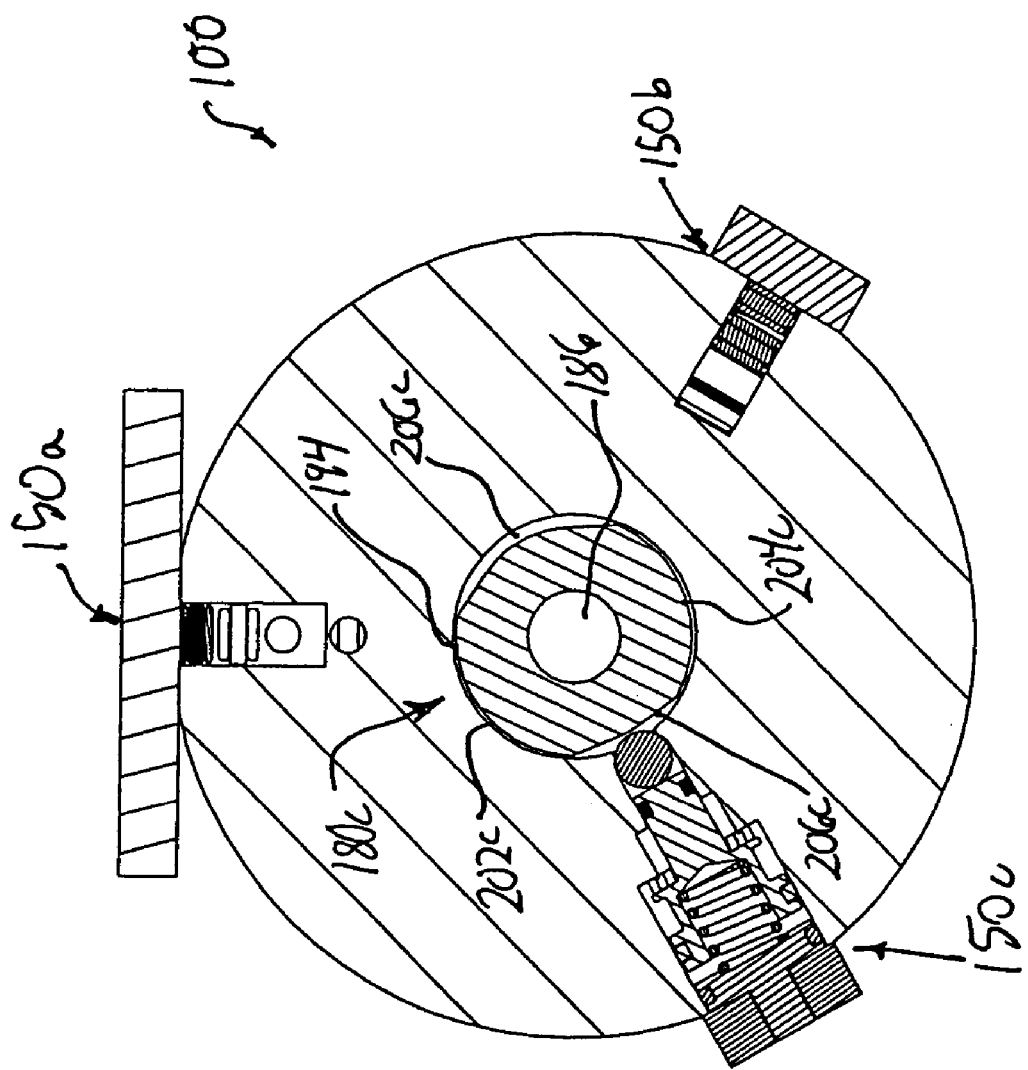
Figure 13:
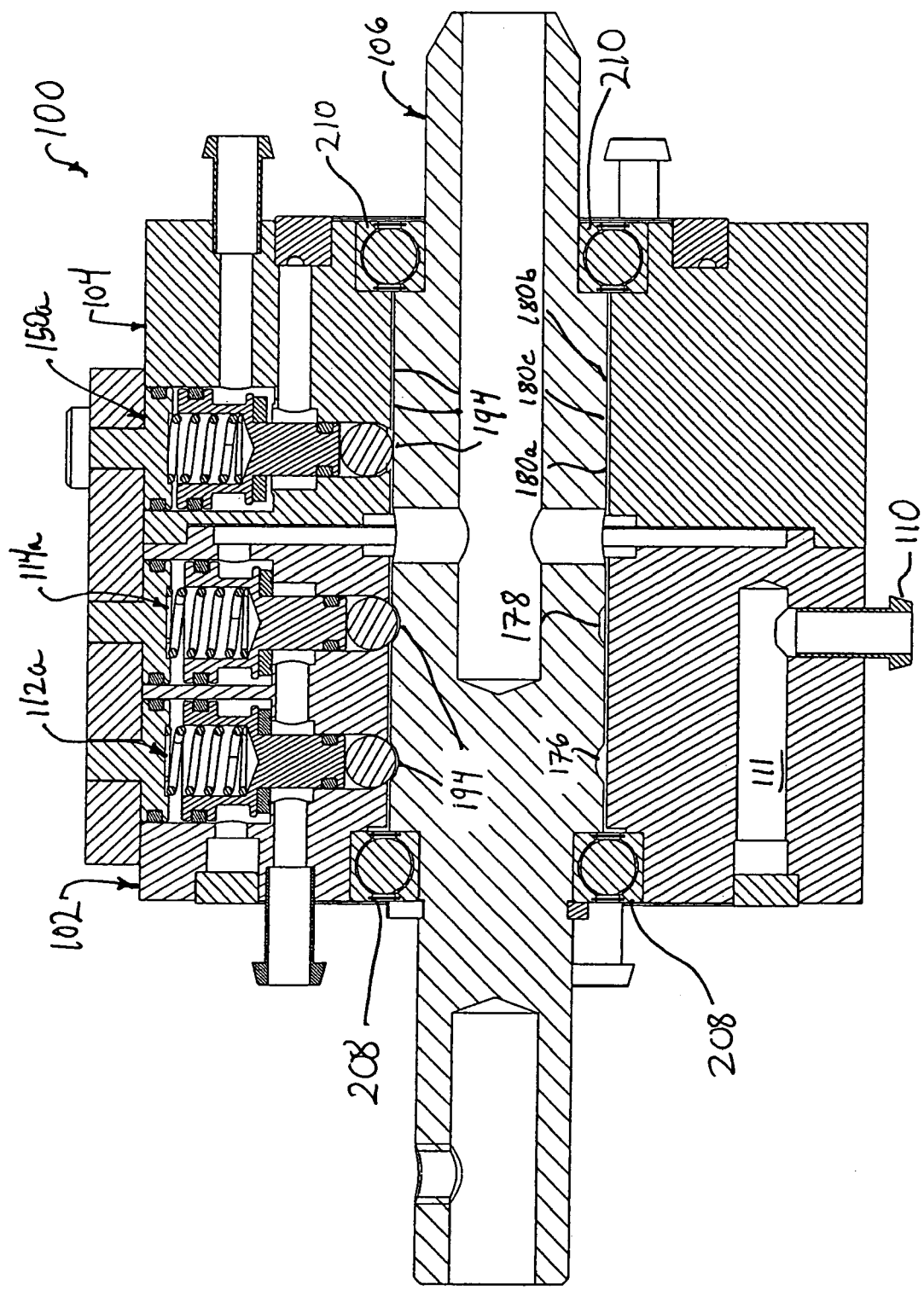

FIG. 10 is a top view of the rotary cam valve 100 showing the location of the valves with phantom lines. The feed cam 176 is shown in profile with the feed valves 112a, 112b, and 112c in FIG. 11a. The feed cam 176 includes a feed cam lobe 190, a feed cam base 192, and a home position 194. The waste cam 178 is shown in profile with the waste valves 114a, 114b, and 114c in FIG. 11b. The waste cam 178 includes a waste cam lobe 196, a waste cam base 198, and the home position 194 as indicated. The equalization cam 180a is shown in profile with the equalization valve 150a in FIG. 12a. The equalization cam 180b is shown in profile with the equalization valve 150b in FIG. 12b. The equalization cam 180c is shown in profile with the equalization valve 150c in FIG. 12c. The equalization cams 180a, 180b, and 180c each include a first equalization cam lobe 202a, 202b, and 202c, respectively and a second equalization cam lobe 204a, 204b, and 204c, respectively. The equalization cams 180a, 180b, 180c further include equalization cam bases 206a, 206b, and 206c and the home position 194 as indicated. The home position 194 lines up with the top of the manifold core 106 and valves 112a, 114a, 150a as shown in FIGS. 8 and 13. The cams are preferably configured such that the maximum radius of each cam lobe is less than or equal to the radius of the manifold core 106 so that the manifold core 106 may be inserted into the central bore 122. Further, the radius of the manifold core 106 is such that there is a gap of approximately 0.005-in to 0.010-in between the manifold core 106 and the inner surface of the central bore 122. Bearings 208 and 210 shown in FIG. 13 maintain the gap between the manifold core 106 and the central bore 122.

As shown in FIGS. 11a, 11b, and 12a–c, the cams are configured for the example described below. In this example, the feed cam lobe 190 is an arc of approximately 94 degrees and is centered at approximately 280 degrees from the home position 194. The waste cam lobe 196 is an arc of approximately 54 degrees and is centered at approximately 140 degrees from the home position 194. The first equalization cam lobes 202 of the equalization cams 180 are arcs of approximately 80 degrees and are centered at approximately 40 degrees from the home position 194. The second equalization cam lobes 204 of the equalization cams 180 are arcs of approximately 80 degrees and are centered at approximately 200 degrees from the home position 194.

Figure 14:
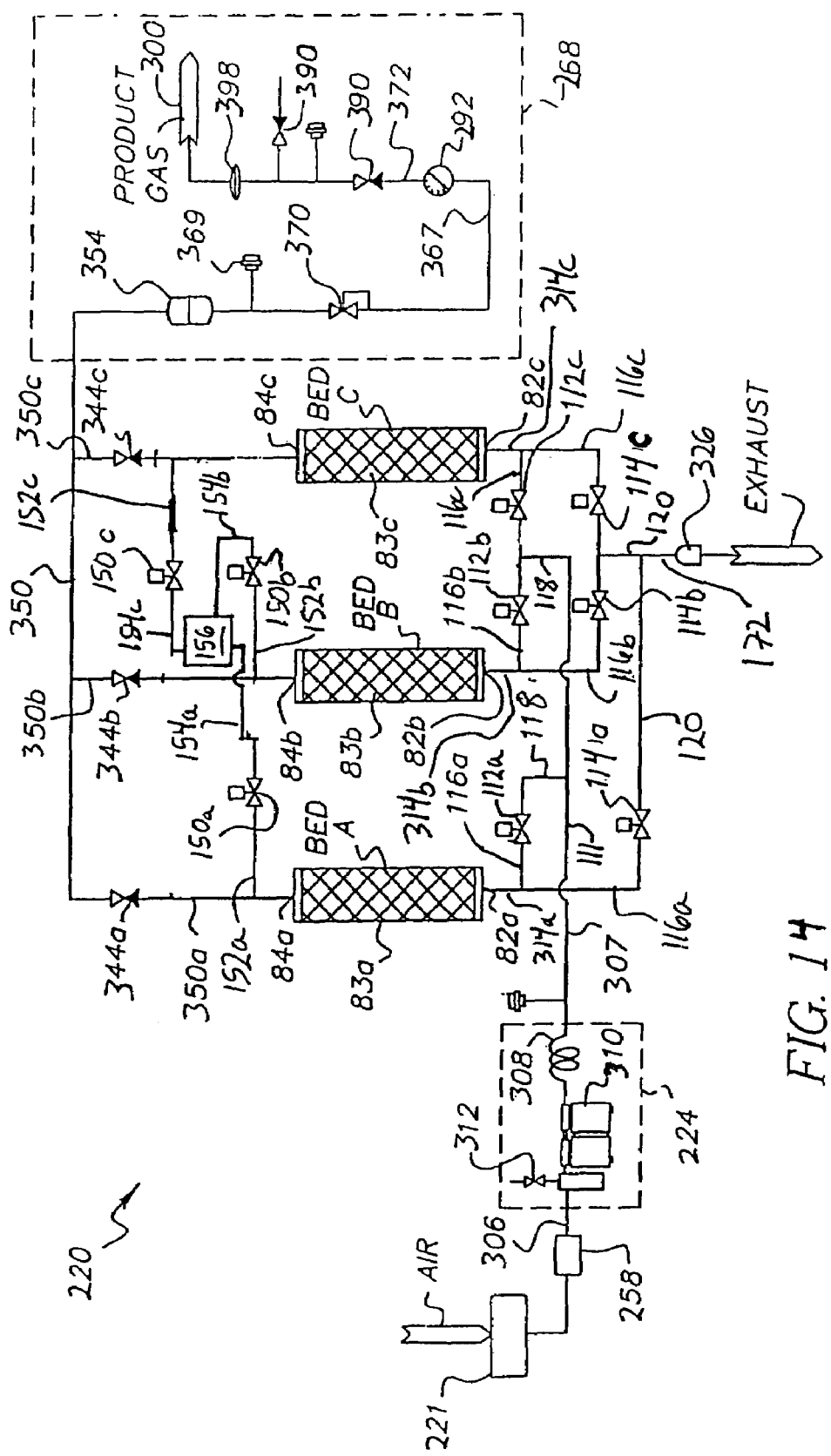
FIG. 14 is a schematic of a pressure swing adsorption apparatus as controlled by the fluid flow controller of the present invention.

In use, the rotary cam valve 100 has a high degree of flexibility in timing and in the number of fluid flows controlled. By way of example, the rotary cam valve can be used in a 9 step gas system—specifically a pressure swing adsorption, or PSA, apparatus. Turning now to FIG. 14, there is shown an example, generally indicated as 220, of a pressure swing adsorption, or PSA, apparatus used for fractionating at least one component, namely nitrogen, from a gaseous mixture, generally but not necessarily ambient air, by pressure swing adsorption. The gaseous air mixture labeled "AIR" is supplied to the apparatus 220 through a particle and vapor filter 221 of an intake resonator 258 to decrease the noise for the intake of the feed stream. From resonator 258, the feed stream continues through fluid line 306 by means of a pump or compressor assembly 224. Compressor assembly 224 containing electrically powered compressor 310 and heat exchanger 308 selectively moves the feed stream through fluid line 307 which is connected to inlet passage 111 through air inlet 110. The feed stream continues through the feed plenum 118 and into the feed chambers 124a, 124b, and 124c. The feed stream is alternately and sequentially directed through the feed/waste passageways 116a, 116b, and 116c to the three input lines 314a, 314b and 314c, respectively, by the sequential operation of corresponding feed poppet valve assemblies 112a, 112b and 112c.

If, for example, poppet valve assembly 112a is open, the feed stream enters an inlet 82a of a first adsorber A in a "co-current" direction, which in FIG. 14 is the upward direction. While passing through a sieve bed 83a contained in adsorber A, the feed stream is fractionated into the desired concentration of product gas by virtue of the substantial portion of nitrogen in the feed stream having been adsorbed by the sieve bed 83a, while the balance of the feed stream, consisting, for example, of about 95% oxygen proceeds as product gas through outlet 84a of first adsorber A. As described in this specification, an adsorber, while it is producing the product gas for delivery to a user of the apparatus, is referred to as the "active" bed whereas each other bed is referred to as an "inactive" bed.

When the internal pressure in adsorber A is at a sufficiently high level, the substantial volume of the product gas exiting adsorber A is then directed through line 350a and a common product supply line 350 to a flow control assembly 268, to be described, to constitute part of the usable product gas available to the user. A check valve 344a is positioned in line 350 to prevent the back flow of product gas from control assembly 268 to adsorber A. Corresponding check valves 344b and 344c are also provided to prevent back flow into adsorbers B and C. The check valves 344a, 344b and 344c are also important because they assist in delaying the delivery of product gas from their respective adsorbers to supply line 350 until the output pressure of the respective adsorber is at least as high as the line pressure, thereby operating the adsorber beds at higher and more efficient pressures.

While adsorber A is functioning as the active bed, adsorber C is an inactive bed but is still pressurized from having been the active bed prior to adsorber A. The equalization valves 150b, and 150c are opened to release the pressurized gas in the inactive adsorber C to flow through the equalization plenum 156 and in a countercurrent direction through outlet 84b of inactive adsorber bed B both to complete purging and to begin repressurization of adsorber B, the purging of which had begun immediately prior to adsorber A having become the active adsorber.

At the end of the portion of the operating cycle in which adsorber A is the active bed, a portion of the product gas produced by adsorber A also is diverted to inactive adsorber B through the equalization plenum 156 by opening equalization valve 150a in order to continue pressurization of adsorber B. At the same time sequence, equalization valve 150c is closed and waste valve 114c is opened in order to cause the remaining pressure in adsorber C to discharge its adsorbed nitrogen by exiting inlet 82c and to be discharged through exhaust plenum 120 to exhaust passageway 172 to the atmosphere through a suitable sound muffler or silencer 326.

Similarly, depending on the sequence of valve openings as determined by rotary cam valve 100, the adsorber beds C and B in sequence become the active beds to produce product gas by the sequential opening of the corresponding feed valves 112c and 112b. The process is repeated in the sequence and for the cycle as will be described.

To control the volume of diverted product gas flowing through lines 152, there may be provided corresponding purge orifices having openings that can be adjusted in size to fix the desired volume and flow of product gas in the counter-current direction through the adsorbers.

Flow control assembly 268, which receives the usable portion of the product gas produced by the three adsorbers A, B, and C, may include a mixing tank 354, a test block component 369, a pressure regulator 370, a conventional flow controller valve 292, check valves 390, a conventional bacteria filter 398 and an outlet connector 300. Mixing tank 354 may be used to average the product gas to the desired concentration. Once through mixing tank 354, the product gas is directed under pressure through line 367 and monitored by pressure regulator 370 until it reaches the flow controller valve 292. The product gas flow rate then is independently controlled by the flow controller valve 292 to proceed through lines 372 and check valve 390 to outlet connector 300.

When each adsorber is saturated with nitrogen, the valve sequence operates to first close its respective feed valve 112 to cause a drop in pressure in, or depressurization of, the adsorber as the balance of the generated product gas exits that adsorber. Once partially depressurized, the waste or exit valve 114 for that adsorber is opened, and part of the product gas produced in another of the inactive adsorbers in a repressurized state is then caused by the appropriate valve sequences to flow in the countercurrent direction to purge the first adsorber, in order to again condition the first adsorber to produce oxygen concentrated product gas in the appropriate sequence in the next cycle of operation.

As will now be evident to those skilled in the art, each adsorber A, B and C comprises a substantially elongated vessel attached to a suitable support structure and has an interior cavity which is substantially filled with a bed of adsorption material adapted to adsorb nitrogen from air routed therethrough. Furthermore, the inlets 82a, 82b, , 82c and outlets 84a, 84b, 84c, respectively, of each adsorber are in flow communication with each other through the bed of adsorption material. Hence, the feed stream of air directed into each adsorber inlet 82 in the co-current direction is exposed to the adsorption material, by which nitrogen in the air is adsorbed, and to regenerate the adsorber, diverted product gas flowing in the counter-current direction (downward as shown in FIG. 14) causes the adsorbed nitrogen to be released by the adsorption material and be discharged to the atmosphere from the corresponding adsorber through its respective inlet 82.

Figure 15:
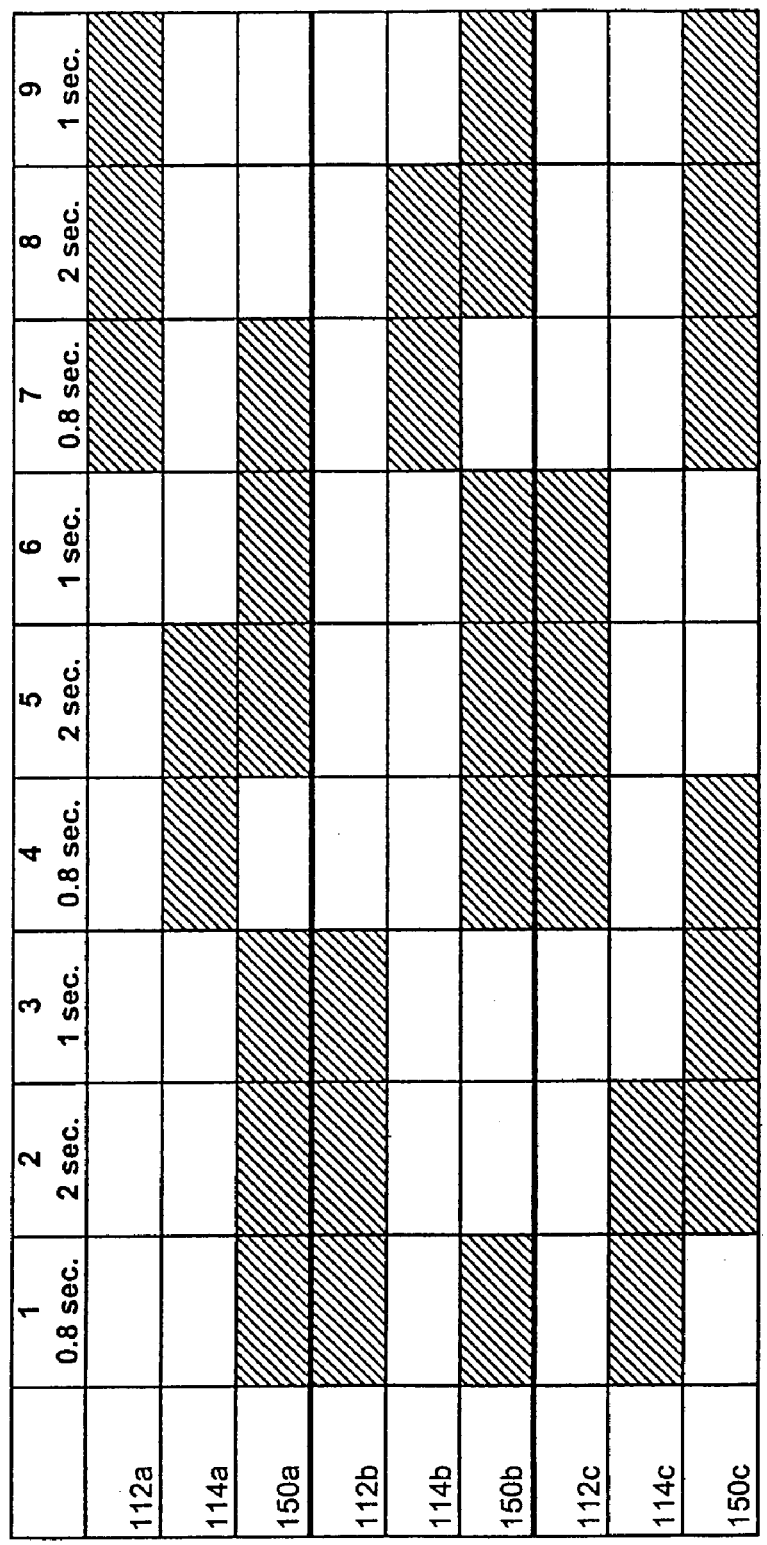
FIG. 15 is a chart showing the valve timing associated with the pressure swing adsorption apparatus of FIG. 14.

As shown by FIG. 15, a three bed PSA apparatus is operated to provide oxygen concentrated gas in operating cycles of nine sequential steps each. In each such cycle step 1 (as shown to be about 0.8 sec. long), takes place with the manifold core 106 in home position 194. Thus valves 112b, 150a, 150b, and 114c are open. During step 1, adsorber B is being repressurized both by diverted product gas of higher pressure delivered in the counter-current direction from adsorber A and by the feed stream in the co-current direction from line 314b. At the same time, with feed valve 112a being closed and no further feed stream air being provided to adsorber A through closed valve 112a, adsorber A is in the process of being depressurized to adsorber B and product gas line 350. At the same time and with waste valve 114c being open, adsorber C (which earlier began its depressurization after having delivered product gas from an earlier cycle) is in the process of completing its depressurization.

In the next step 2, about 2 seconds in length and according to the invention, the manifold core 106 rotates 40 degrees clockwise (looking at the drive shaft receptacle 170). Thus valves 112b, 150a, 150c and 114c are open. By this valve sequence, the now active adsorber B continues to repressurize while it begins to supply product gas to line 350, and at substantially the same time, adsorber A, now inactive, is being depressurized through adsorber C in which the remaining product gas from adsorber A is diverted to adsorber C through equalization plenum 156 to flow in the counter current direction through adsorber C to purge and discharge the previously adsorbed nitrogen in adsorber C. From this step 2, it can be seen that delivery of product gas is delayed until a higher pressure is achieved, which results in an even more consistent purity in the product gas.

In step 3, lasting for about 1.0 second, the manifold core 106 rotates 40 degrees clockwise. Thus waste valve 114c is closed, while valves 112b, 150a, and 150c remain open. Adsorber B continues to supply product gas while adsorber A continues its depressurization and continues to supply product gas to adsorber C to repressurize adsorber C.

In step 4 (about 0.8 seconds long), the manifold core 106 rotates 40 degrees clockwise. Thus valves 112c, 150b, 150c, and 114a are open. Adsorber B continues to supply product gas to line 350 while some of that gas now is diverted to adsorber C to continue repressurization of the latter. With only valve 114a open for adsorber A, some of the remaining gases in adsorber A are discharged through valve 114a to reduce its internal pressure.

As now can be seen, during steps two through four of the operating cycle, adsorber B is the active adsorber principally to supply the product gas, inactive adsorber A is used principally to purge nitrogen from and repressurize inactive adsorber C while adsorber C completes its purge cycle and begins to repressurize.

Similarly, in steps five through seven, and in the same sequence of timed steps and corresponding valve openings, adsorber C is the active adsorber principally supplying the product gas to output line 350, while the remaining product gas in the pressurized and now inactive adsorber B is diverted to adsorber A to purge adsorber A of its adsorbed nitrogen and begin repressurization of the latter.

In steps eight through one, again with similar times and corresponding valve sequences, adsorber A is the active adsorber, pressurized gas from now inactive adsorber C is diverted in the countercurrent direction to purge inactive adsorber B and begin repressurization of the latter.

The sequence of nine steps is repeated through continued cycles of operation of the apparatus as the manifold core 106 is rotated 40 degrees for each step.

An advantage of the invention is that it occupies a space of approximately ⅓ or less that of a bank of solenoid valves of comparable capacity. Further, because the present invention is actuated by a rotating cam shaft, it is considerably quieter than solenoid valves. The valves that are open and closed for each step is determined by the shape and orientation of the cams on the manifold core 106. The simplified construction of the rotary cam valve 100 means that it has a reduced cost.

It should be particularly noted that the valve timing can be changed by altering the arc lengths and orientation of the cam lobes 190, 196, 202a–c, and 204a–c. The timing of the equalization valves 150a, 150b, and 150c may be altered independently of each other because they are actuated by separate cams. The timing may be altered further by varying the time between rotations of the manifold core 106 as controlled by the micro-controller. Many alternative valve timings may be imagined including the 12 step PSA cycle described in the U.S. Pat. No. 6,558,451 to McCombs, et al, In addition, the rotary cam valve 100 may be configured for a different number of targets by adding or subtracting rows of valves. For example, valves 112d, 114d, and 150d would be added for use in a four target system. A two target system would only require valves 112a, 114a, 112b, 114b, and one equalization valve 150. Also, other valves may be used to introduce a secondary fluid such as a medicinal fluid in timed sequences into the system by adding a secondary fluid port in fluid communication with plenum 156. Thus, it should be evident that a rotary cam valve according to the invention may be used with liquids or gases.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A rotary cam valve for controlling fluid flow in a system, comprising:
   a plurality of radially disposed intake valves, each of said plurality of intake valves being biased in a closed or an open position;
   a plurality of radially disposed output valves, each of said plurality of output valves being biased in a closed or an open position;
   a rotatable manifold core having a plurality of cam surfaces, each of the cam surfaces engaging at least one intake valve or at least one output valve to allow the valve to travel to the biased position and to force the valve to travel against the biased position; and
   an actuator engaging said manifold core for rotating said manifold core in sequence in predetermined amounts, and for a predetermined time for each amount of rotation.

2. The rotary cam valve of claim 1, wherein each of said intake valves is in fluid communication with one of a plurality of targets such that said intake valve controls fluid flow to the target, and each of said output valves is in fluid communication with one of a plurality of targets such that said output valve controls fluid flow from the target.

3. The rotary cam valve of claim 1, further comprising:
   a plurality of radially disposed equalization valves each of said plurality of equalization valves being biased in a closed or an open position;
   a equalization plenum in fluid communication with said plurality of equalization valves; and
   wherein each of said equalization valves is in fluid communication with one of the plurality of targets and said equalization plenum such that said equalization valve controls fluid flow between the target and said equalization plenum.

4. The rotary cam valve of claim 1, further comprising a stepper motor or a pneumatic actuator engaging said cam shaft to thereby rotate said cam shaft according to a predetermined schedule.

5. A rotary cam valve, comprising:
   a plurality of radially disposed feed valves having a feed valve input and a feed valve exhaust;

an inlet port in fluid communication with the feed valve inputs of said plurality of feed valves;

a plurality of radially disposed output valves having an output valve intake and an output valve exhaust, said plurality of output valves in a plane parallel to said plurality of feed valves;

an output pathway in fluid communication with the output valve exhausts of said plurality of output valves;

a rotatable cam shaft having in predetermined orientation a feed cam engaging said plurality of feed valves and an output cam engaging said plurality of output valves;

the orientation of said camshaft in rotation determining the time during which said feed valves and output valves are open and closed.

6. The rotary cam valve of claim 5, further comprising a plurality of targets having a first target port and a second target port, wherein each of the first target ports is in fluid communication with the feed valve exhaust of one of said plurality of feed valves, each of the first target ports is further in fluid communication with the output valve intake of a corresponding one of said plurality of output valves, and each of the second target ports is in fluid communication with the equalization valve intake of one of said plurality of equalization valves.

7. The rotary cam valve of claim 5, further comprising:

a plurality of radially disposed equalization valves having an equalization valve intake and an equalization valve exhaust, each of said plurality of equalization valves in a separate plane parallel to said plurality of output valves;

a plenum in fluid communication with the equalization valve exhausts of said plurality of equalization valves; and said cam shaft further comprising an equalization cam engaging each of said equalization valves such that rotation of said camshaft determines the timing of the opening and closing of said equalization valves.

8. The rotary cam valve of claim 5, further comprising a stepper motor or a pneumatic actuator engaging said cam shaft to thereby rotate said cam shaft according to a predetermined schedule.

* * * * *